(No Model.)
W. P. WILSON.
COFFEE OR TEA POT.
No. 546,967.    Patented Sept. 24, 1895.
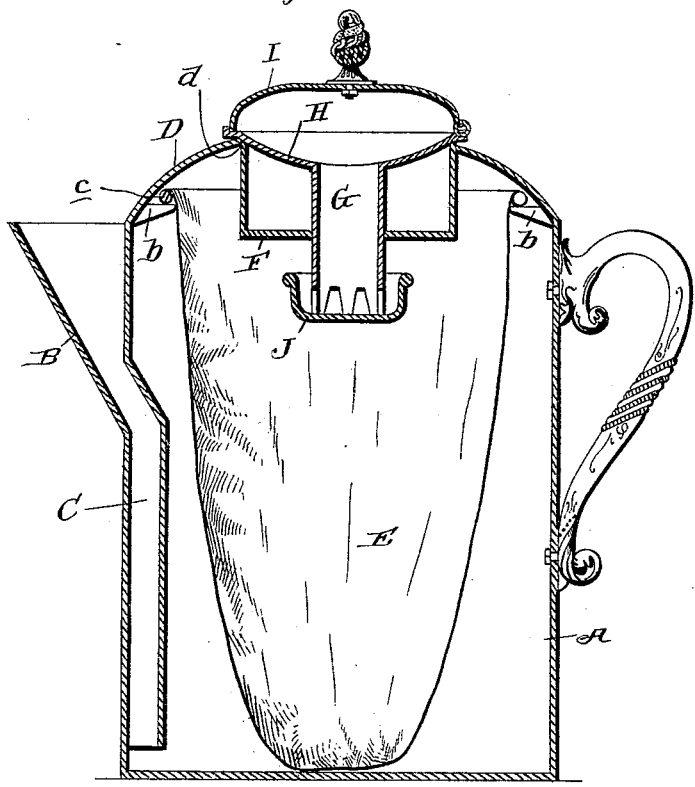
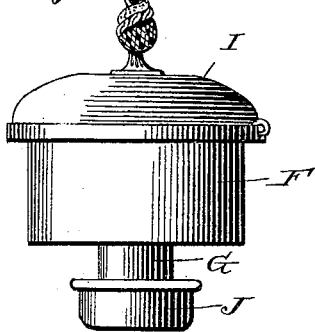
Witnesses:
C. H. Raeder
K. F. Matthews.
Inventor
W. P. Wilson
By James J. Sheehy
Attorney

UNITED STATES PATENT OFFICE.

WILLIAM P. WILSON, OF BOSTON, MASSACHUSETTS.

COFFEE OR TEA POT.

SPECIFICATION forming part of Letters Patent No. 546,967, dated September 24, 1895.

Application filed April 8, 1895. Serial No. 544,998. (No model.)

*To all whom it may concern:*

Be it known that I, WILLIAM P. WILSON, a citizen of the United States, residing at Boston, in the county of Suffolk and State of Massachusetts, have invented certain new and useful Improvements in Coffee or Tea Pots; and I do declare the following to be a full, clear, and exact description of the invention, such as will enable others skilled in the art to which it appertains to make and use the same.

My invention relates to improvements in that class of coffee or tea pots which are constructed with a view of preventing the escape of any of the aroma of the coffee or tea, and its novelty will be fully understood from the following description and claim, when taken in conjunction with the annexed drawings, in which—

Figure 1 is a vertical sectional view of a coffee or tea pot with my improvements applied. Fig. 2 is a side view of the improvements removed from the pot.

Referring by letter to said drawings, A indicates the body of the pot, and B the spout of the same, which is connected to the outside of the body. This spout is connected with the interior of the body by a conduit C, which is arranged upon the inner side of the body and extends to a point adjacent to the bottom of the pot, as shown in the class of pots above referred to, whereby the contents may be drawn from the bottom instead of the top, thereby preventing the escape of steam and aroma through the spout when the pot is in use. The body of the pot is provided at its upper end with a concavo-convex top D, which is connected to or formed integral with it, and this top is provided on its inner side with a ledge $b$, which is designed to support the ring $c$ of the coffee or tea-holding bag E, which ring $c$ is preferably broken and has its ends lapped, so that it may be compressed and readily removed through the opening in the top to permit of the bag E being readily cleaned, and also to permit of its being readily disconnected from the bag and employed in conjunction with a new bag, when desired. The said top D is further provided with a central opening $d$, and in this opening is arranged the condensing-receptacle F, which is designed to contain air to condense the steam as it rises in the pot, as will be hereinafter explained. This receptacle F surrounds the vertical tube G, and is connected to or formed integral with said tube and the concavo-convex flange H at the upper end thereof, the extended portion of which flange H bears upon the cover and serves to suspend the tube G and the receptacle F within the pot, as shown.

I indicates the hinged cap of the cover which rests over the flange H and closes the upper end of the tube G, and J indicates a cup which receives from and is connected to the lower notched end of said tube, as shown. This cup J serves, when the hot water with which the coffee or tea is made is poured through the tube G, to retain a portion of the water and thereby form a water seal, which will effectually prevent the steam and aroma in the pot from entering the lower end of the said tube G and escaping through the same.

By reason of the lower end of the tube G being notched, as shown and described, it will be observed that the bottom of the cup J may be securely connected to the lower end of said tube, and that therefore it is not necessary to provide said cup with a cover or with bracket-arms for connection to the tube, which are objectionable because they materially increase the cost of manufacturing.

In the practice of my invention, the coffee or tea from which the beverage is to be made is placed in the bag E. The cap I is then raised and the hot water is poured into the upper end of the tube G, from which it will pass into the cup J, and will flow over the edge of the same into the coffee or tea in the bag, and at the same time will form a water seal, which will effectually prevent any of the steam or aroma of the coffee from escaping through the tube G. After the hot water is poured into the pot the cap I is closed and the contents of the pot are allowed to stand a few minutes before use. As before stated, the receptacle F and the tube G are connected to or formed integral with the flange H, which bears upon the upper side of the cover D, as shown in Fig. 1, and it will therefore be seen that the said elements, together with the cap I and cup J, form an attachment which may be readily removed from the cover to permit of them and the pot being readily cleaned, or for any other purpose. It will also be seen from the foregoing that inasmuch as the receptacle F, the tube G, and the flange H may be formed integral, that my improved pot may be manufactured almost as cheaply as the ordinary pot at present in use.

Having described my invention, what I claim is—

The coffee pot described consisting essentially of the body having a top provided with a central opening d, and the removable attachment comprising the hot-water feed tube G, arranged in the pot and having the flange H, at its upper end arranged in the top opening d, and bearing upon the upper side of the top and also having its lower end notched, the cup J, having its bottom connected to the lower notched end of the tube G, and its side wall surrounding said notched end, the condensing receptacle F, surrounding the tube G, and connected to said tube and to the flange H, thereof, and the cap I, connected in a hinged manner to the flange H, of the tube G, all as and for the purpose set forth.

In testimony whereof I affix my signature in presence of two witnesses.

WILLIAM P. WILSON.

Witnesses:
ELMER WICKES,
A. H. WELLS.